(12) United States Patent
Xiao et al.

(10) Patent No.: US 8,656,153 B2
(45) Date of Patent: Feb. 18, 2014

(54) AUTHENTICATION ACCESS METHOD AND AUTHENTICATION ACCESS SYSTEM FOR WIRELESS MULTI-HOP NETWORK

(75) Inventors: Yuelei Xiao, Xi'an (CN); Jun Cao, Xi'an (CN); Xiaolong Lai, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 396 days.

(21) Appl. No.: 12/810,374

(22) PCT Filed: Dec. 26, 2008

(86) PCT No.: PCT/CN2008/073755
§ 371 (c)(1),
(2), (4) Date: Jun. 24, 2010

(87) PCT Pub. No.: WO2009/089738
PCT Pub. Date: Jul. 23, 2009

(65) Prior Publication Data
US 2010/0293370 A1 Nov. 18, 2010

(30) Foreign Application Priority Data
Dec. 29, 2007 (CN) .......................... 2007 1 0307299

(51) Int. Cl.
H04L 29/06 (2006.01)

(52) U.S. Cl.
USPC ................................. 713/155; 713/150; 726/5

(58) Field of Classification Search
USPC ................................. 713/155; 726/5; 709/239
See application file for complete search history.

(56) References Cited

U.S. PATENT DOCUMENTS

| 7,573,855 | B2 | 8/2009 | Hohl et al. |
| 2002/0161921 | A1 | 10/2002 | Kurakake et al. |
| 2004/0240412 | A1 | 12/2004 | Winget |
| 2005/0238171 | A1 | 10/2005 | Chen et al. |

(Continued)

FOREIGN PATENT DOCUMENTS

| CN | 1655504 A | 8/2005 |
| CN | 1835436 A | 9/2006 |

(Continued)

OTHER PUBLICATIONS

Russian Decision on Grant regarding Application No. 201031184/08(044215), dated Sep. 23, 2011. Translation provided by Unitalen Attorneys at Law.

(Continued)

*Primary Examiner* — Farid Homayounmehr
*Assistant Examiner* — Suman Debnath
(74) *Attorney, Agent, or Firm* — Harness, Dickey & Pierce, P.L.C.

(57) ABSTRACT

Authentication access method and authentication access system for wireless multi-hop network. Terminal equipment and coordinator have the capability of port control, the coordinator broadcasts a beacon frame, and the terminal equipment selects an authentication and key management suite and transmits a connecting request command to the coordinator. The coordinator performs authentication with the terminal equipment according to the authentication and key management suite which is selected by the terminal equipment, after authenticated, transmits a connecting response command to the terminal equipment. The terminal equipment and the coordinator control the port according to the authentication result, therefore the authenticated access for the wireless multi-hop network is realized. The invention solves the security problem of the wireless multi-hop network authentication method.

9 Claims, 3 Drawing Sheets

(56) References Cited

U.S. PATENT DOCUMENTS

| | | |
|---|---|---|
| 2007/0136796 A1 | 6/2007 | Sanchez et al. |
| 2007/0162751 A1 | 7/2007 | Braskich et al. |
| 2007/0184837 A1 | 8/2007 | Hohl et al. |
| 2008/0043686 A1* | 2/2008 | Sperti et al. ............ 370/338 |

FOREIGN PATENT DOCUMENTS

| | | |
|---|---|---|
| CN | 1918876 A | 2/2007 |
| CN | 101009919 A | 8/2007 |
| CN | 101222772 A | 7/2008 |
| CN | 101232378 A | 7/2008 |
| EP | 1566938 A1 | 8/2005 |
| JP | 2007523551 A | 8/2007 |
| RU | 2297663 C2 | 4/2007 |
| WO | WO-0048358 A1 | 8/2000 |
| WO | WO-2005109823 A1 | 11/2005 |
| WO | WO-2006086931 A1 | 8/2006 |
| WO | WO-2007112133 A2 | 10/2007 |

OTHER PUBLICATIONS

Extended European Search Report regarding Application No. 08870976.1-2415/2234366, dated Jan. 31, 2013.

Qiang Tang. "On the Security of Three Versions of the WAI Protocol in Chinese WLAN Implementation Plan." Communications and Networking in China. Chinacom '07. Second International Conference on IEEE. Piscataway, New Jersey, USA. Aug. 22, 2007. pp. 333-339.

ChangHua He and John C. Mitchell. "1 Message Attack on the 4-Way Handshake." IEEE P802.11. Wireless LANs. May 2004.

Jesse Walker. JTC1 SC6 doc 6N12687. IEEE P802.11. Wireless LANs. Dec. 1, 2004.

"Authentication Access Method and System for Wireless Multi-hop Network." IEEE802.1x IEEE802.11i. Network Magazine. Jun. 2004. pp. 138-141.

Lan, Chapter 8. Interface. Feb. 2007. pp. 128-136.

Information Security Encyclopedia. Kyoritsu Shuppan Co., Ltd. pp. 299-310. 2003.

* cited by examiner

AUTHENTICATION ACCESS METHOD AND AUTHENTICATION ACCESS SYSTEM FOR WIRELESS MULTI-HOP NETWORK

This application claims priority to Chinese Patent Application No. 200710307299.5, filed with the Chinese Patent Office on Dec. 29, 2007 and entitled "Authentication access method applicable to wireless multi-hop network", which is hereby incorporated by reference in its entirety.

FIELD OF THE INVENTION

The present invention relates to a network authentication access method and in particular to an authentication access method and system applicable to a wireless multi-hop network.

BACKGROUND OF THE INVENTION

Along with the development of computer networks and global mobile communication technologies, portable digital processing terminal devices including notebook computers, Personal Digital Assistants (PDAs), computer peripherals, mobile phones, pagers, home electronic appliances, etc., have become necessitates of daily life and office of people. All of the devices possess a powerful processing capability and a larger storage space to thereby form a Personal Operation Space (POS). However, at present, information has to be exchanged between these terminal devices generally through a cable connection, thus causing much inconvenience, and it is increasingly desired for people to connect wirelessly these terminal devices in the personal operation space to truly enable mobile and automatic intercommunication between the terminal devices, which is referred to as wireless multi-hop network technology. In a wireless multi-hop network, data communicated between non-adjacent terminal devices has to be transmitted in a way of multi-hop route.

Figure 1A:
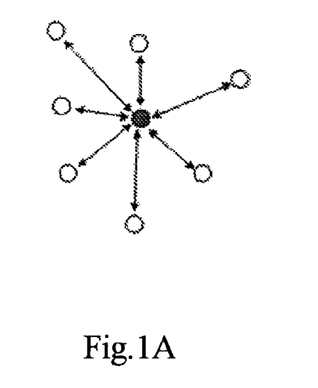
FIG. 1A is a structural diagram of an star network topology.
Figure 1B:
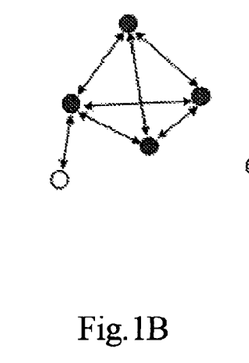
FIG. 1B is a structural diagram of a mesh network topology.
Figure 1C:
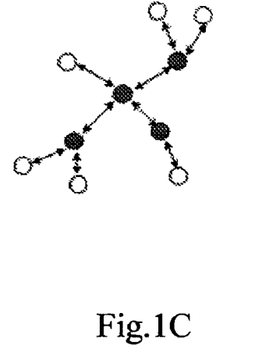
FIG. 1C is a structural diagram of a cluster network topology, a coordinator is denoted with "●", a terminal device is denoted with "○", a communication channel is denoted with "↔", and S represents a network coordinator acting as a trusted center of the network.

There are devices playing four roles in a wireless multi-hop network: a terminal device, a route coordinator, a network coordinator and a trusted center. The terminal device can communicate with other devices in the network but can not forward data for the other devices over the network, that is, the terminal device can not perform a routing function. In addition to the function of the terminal device, the route coordinator is also responsible for forwarding data for the other devices in the network, that is, the route coordinator can perform the routing function. The network coordinator is responsible for transmitting a network beacon, setting up a network, managing a network node, storing network node information, searching for a route message between a pair of nodes and continuously receiving information and also can forward data for the other devices in the network, that is, the network coordinator can perform the routing function. The network coordinator and the route coordinator can be referred collectively to as a coordinator. The trusted center is a key management center of the network and is responsible for configuring all the devices in the network with key information. The network coordinator or another device designated in the network by the network coordinator can act as the trusted center. FIG. 1A to FIG. 1C illustrates two network topology structures supported by a wireless multi-hop network: a star structure (as illustrated in FIG. 1A) and a point-to-point network, where the point-to-point network can further be divided into a mesh structure (as illustrated in FIG. 1B) and a cluster structure (as illustrated in FIG. 1C).

For a wireless multi-hop network, security solutions in current use include the following two ones:

A first security solution is in the form of a self-organized network.

A device is firstly connected into a wireless multi-hop network and then acquires key information dynamically from the wireless multi-hop network, e.g., an ID-based private key (identity-based cryptography) acquired from a distributed Certification Authority (CA) in the wireless multi-hop network, and finally uses the ID-based public and private keys for secure communication.

A second security solution is in the form of connecting and then authentication.

Firstly a device is connected into a wireless multi-hop network, then the network coordinator authenticates the device and finally the device uses a negotiated session key for secure communication, e.g., in the standard of IEEE802.15.4/ZigBee.

In the first security solution, any device can be a member of the wireless multi-hop network without distinguishing between legal and illegal devices, which apparently would be insecure. In the second security solution, since the network coordinator does not authenticate the device until the device is connected into the wireless multi-hop network, any devices may be connected into the wireless multi-hop network and communicate with another device in the network before the network coordinator removes it from the network, which also would be insecure and result in a waste of communication.

SUMMARY OF THE INVENTION

An object of the invention is to provide an authentication access method and system applicable to a wireless multi-hop network in order to address the technical problem of a hidden security danger of an authentication method for a wireless multi-hop network in the prior art.

Technical solutions of the invention are as follows:

An authentication access method applicable to a wireless multi-hop network includes:

defining an uncontrolled port and a controlled port of a terminal device and a coordinator, where the uncontrolled port pass an authentication protocol data packet and management information and the controlled port pass an application data packet;

broadcasting, by the coordinator, a beacon frame comprising authentication and key management suites supported by the coordinator;

selecting, by the terminal device upon reception of the beacon frame of the coordinator, one of the authentication and key management suites, and then transmitting to the coordinator a connection request command comprising the authentication and key management suites selected by the terminal device;

performing, by the coordinator upon reception of the connection request command of the terminal device, an authentication process with the terminal device according to the authentication and key management suites selected by the terminal device, and upon successful authentication, opening the controlled port to allow an access of the terminal device to the wireless multi-hop network while transmitting a connection response command to the terminal device; and opening, by the terminal device upon reception of the connection response command of the coordinator, the controlled port to thereby access the wireless multi-hop network.

Preferably in the foregoing technical solution, the authentication and key management suite include an authentication and key management suite based upon a pre-shared key and an ID-based authentication and key management suite.

Preferably in the foregoing technical solution, the authentication process includes:

A. when the coordinator knows from the connection request command transmitted from the terminal device that the authentication and key management suite selected by the terminal device is an ID-based authentication and key management suite, generating an authentication inquiry of the coordinator, and transmitting an authentication activation consisting of the authentication inquiry of the coordinator and a public key of the coordinator to the terminal device;

B. when validity verification of the public key of the coordinator is passed, generating, by the terminal device upon reception of the authentication activation, an authentication inquiry of the terminal device, an identifier of a public key revocation query and a temporary public key of the terminal device, and transmitting an authentication request consisting of the authentication inquiry of the terminal device, the authentication inquiry of the coordinator, a public key of the terminal device, the identifier of the public key revocation query, the temporary public key of the terminal device and a signature of the terminal device on the above five items of information to the coordinator;

C. verifying, by the coordinator upon reception of the authentication request, the signature of the authentication request for legality, the authentication inquiry of the coordinator for consistency and the temporary public key of the terminal device for validity; when verification is passed, determining according to the identifier of the public key revocation query whether to perform the public key revocation query; if the public key revocation query is not to be performed, generating a temporary public key of the coordinator and an access result, then transmitting, by the coordinator, an authentication response consisting of the identifier of the public key revocation query, the authentication inquiry of the terminal device, the temporary public key of the coordinator, the access result and a signature of the coordinator on the above four items of information to the terminal device, and then performing step G; or if the public key revocation query is to be performed, transmitting a public key revocation query request;

D. verifying, by a trusted center upon reception of the public key revocation query request, the information of the public key revocation query request, and then transmitting a public key revocation query response to the coordinator;

E. verifying, by the coordinator upon reception of the public key revocation query response, the information of the public key revocation query response, and then transmitting the authentication response to the device; and also generating a base key between the terminal device and the coordinator according to the temporary public key of the terminal device and a temporary private key of the coordinator;

F. verifying, by the terminal device upon reception of the authentication response, the information of the authentication response, where if verification fails, the authentication fails; otherwise, the terminal device generates the base key between the terminal device and the coordinator according to the temporary public key of the terminal device and the temporary private key of the coordinator and the authentication is successful; and G. verifying, by the terminal device upon reception of the authentication response transmitted in the step C from the coordinator, the signature of the authentication response for validity, the authentication inquiry of the terminal device for consistency and the access result, where if verification fails, the authentication fails; otherwise, the terminal device generates the base key between the terminal device and the coordinator according to the temporary public key of the terminal device and the temporary private key of the coordinator and the authentication is successful.

Preferably, the foregoing technical solution further includes:

performing, by the terminal device upon successful connection to the coordinator, unicast key negotiation with the coordinator.

Preferably in the foregoing technical solution, the unicast key negotiation is performed in the following steps of:

when a unicast key is required to be created or updated, generating, by the coordinator upon successful authentication, a unicast key negotiation inquiry of the coordinator, and transmitting a unicast key negotiation request consisting of the unicast key negotiation inquiry of the coordinator to the terminal device;

generating, by the terminal device upon reception of the unicast key negotiation request, a unicast key negotiation inquiry of the terminal device, generating a unicast key between the terminal device and the coordinator according to the base key, the unicast key negotiation inquiry of the coordinator and the unicast key negotiation inquiry of the terminal device, and then transmitting to the coordinator a unicast key negotiation response consisting of the unicast key negotiation inquiry of the coordinator, the unicast key negotiation inquiry of the terminal device and a message authentication code, where the message authentication code is calculated by the terminal device according to the unicast key negotiation inquiry of the coordinator and the unicast key negotiation inquiry of the terminal device;

calculating, by the coordinator upon reception of the unicast key negotiation response, the unicast key according to the base key, the unicast key negotiation inquiry of the coordinator and the unicast key negotiation inquiry of the terminal device, then verifying the unicast key negotiation inquiry of the coordinator for consistency and the message authentication code of the terminal device for validity, where if verification fails, the unicast key negotiation fails; otherwise, the coordinator transmits a unicast key negotiation acknowledgement consisting of the unicast key negotiation inquiry of the coordinator and the message authentication code calculated on the unicast key negotiation inquiry of the terminal device to the terminal device; and verifying, by the terminal device upon reception of the unicast key negotiation acknowledgement, the unicast key negotiation inquiry of the terminal device for consistency and the message authentication code of the coordinator for validity, where if verification fails, the unicast key negotiation fails; otherwise, the unicast key negotiation is successful.

Preferably in the foregoing technical solution, the authentication process includes:

a. when the coordinator knows from the connection request command transmitted from the terminal device that the authentication and key management suite selected by the terminal device is an authentication and key management suite based upon a pre-shared key, expanding, by the coordinator, a locally stored pre-shared key between the coordinator and the terminal device into a corresponding base key, generating an authentication inquiry of a pre-shared key of the coordinator, and then transmitting an authentication request consisting of the authentication inquiry of the pre-shared key of the coordinator to the terminal device;

b. firstly expanding, by the terminal device upon reception of the authentication request, the locally stored pre-shared key between the coordinator and the terminal device into the corresponding base key, generating an authentication inquiry of a pre-shared key of the terminal device, generating a unicast key between the terminal device and the coordinator according to the base key, the authentication inquiry of the pre-shared key of the coordinator and the authentication inquiry of the pre-shared key of the terminal device, and then transmitting to the coordinator an authentication response consisting of the authentication inquiry of the pre-shared key of the coordinator, the authentication inquiry of the pre-shared key of the terminal device and a message authentication code, where the message authentication code is calculated from the authentication inquiry of the pre-shared key of the coordinator and the authentication inquiry of the pre-shared key of the terminal device;

c. calculating, by the coordinator upon reception of the authentication response, the unicast key from the base key and the authentication inquiry of the pre-shared key of the coordinator generated in the step a and the authentication inquiry of the pre-shared key of the terminal device, then verifying the authentication inquiry of the pre-shared key of the coordinator for consistency and the message authentication code of the terminal device for validity, where if verification fails, the authentication fails; otherwise, the coordinator transmits an authentication acknowledgement consisting of the authentication inquiry of the pre-shared key of the terminal device and the message authentication code calculated by the coordinator on the authentication inquiry of the pre-shared key of the terminal device to the terminal device; and d. verifying, by the terminal device upon reception of the authentication acknowledgement, the authentication inquiry of the pre-shared key of the terminal device for consistency and the message authentication code of the coordinator for validity, where if verification fails, the authentication fails; otherwise, the authentication is successful.

Preferably, the foregoing technical solution further includes:

performing, by the terminal device upon successful connection to the coordinator, unicast key negotiation with the coordinator.

Preferably in the foregoing technical solution, when the unicast key is required to be created or updated, the coordinator determines whether the unicast key negotiation is a unicast key negotiation for a first time upon successful authentication with the device, and if so, a process of the unicast key negotiation is the same as the authentication process; otherwise, the process of the unicast key negotiation is the same as the unicast key negotiation process based upon the ID-based authentication and key management suite.

Preferably, the foregoing technical solution further includes:

performing, by the coordinator and the terminal device, a multicast key announcement process upon completion of the unicast key negotiation; and if the unicast key negotiation is passed and the coordinator is required to perform multicast key negotiation with the terminal device, performing, by the coordinator, the multicast key announcement process with the terminal device.

Preferably in the foregoing technical solution, the multicast key announcement process includes:

when a multicast key is required to be created or updated, firstly calculating, by the coordinator upon successful unicast key negotiation, the multicast key from an announcement master key, then encrypting the announcement master key using an encryption key in the unicast key to generate an identifier of a multicast key announcement, and finally transmitting to the terminal device the multicast key announcement consisting of the identifier of the multicast key announcement, the encrypted multicast announcement master key and a message authentication code, where the message authentication code is calculated by the coordinator from the identifier of the multicast key announcement and the encrypted multicast announcement master key using an authentication key in the multicast key;

verifying, by the terminal device upon reception of the multicast key announcement, the identifier of the multicast key announcement and calculating the multicast key from the announcement master key, then further verifying the message authentication code of the coordinator for validity, and when verification is passed, transmitting to the coordinator a multicast key response consisting of the identifier of the multicast key announcement and a message authentication code, where the message authentication code is calculated by the terminal device from the identifier of the multicast key announcement message using an authentication key in a locally generated multicast key; and verifying, by the coordinator upon reception of the multicast key response, the identifier of the multicast key announcement for consistency and the message authentication code of the terminal device for validity, where if verification fails, the multicast key negotiation fails; otherwise, the multicast key negotiation is successful.

An embodiment of the invention further provides an authentication access system applicable to a wireless multi-hop network, which includes a terminal device, a coordinator and a trusted center, where:

the terminal device and the coordinator are provided with an uncontrolled port and a controlled port, where the uncontrolled port pass an authentication protocol data packet and management information and the controlled port pass an application data packet;

the coordinator is adapted to broadcast a beacon frame comprising authentication and key management suites supported by the coordinator, to perform an authentication process with the terminal device and the trusted center according to an authentication and key management suite selected by the terminal device upon reception of a connection request command of the terminal device, where the connection request command comprises the authentication and key management suite selected by the terminal device, and to open the controlled port to allow an access of the terminal device to the wireless multi-hop network while to transmit a connection response command to the terminal device upon successful authentication; and the terminal device is adapted to select the authentication and key management suite and then transmit the connection request command to the coordinator upon reception of the beacon frame of the coordinator, where the connection request command comprises the authentication and key management suite selected by the terminal device and to open the controlled port to thereby access the wireless multi-hop network upon reception of the connection response command of the coordinator; and the trusted center is adapted to facilitate the authentication process of the coordinator and the terminal device.

As can be apparent from the foregoing technical solutions, the embodiments of the invention offer the following advantages over the prior art:

1. The terminal device can be connected to the coordinator only after being authenticated to thereby enable an authentication access of the terminal device to the wireless multi-hop network. The terminal device can also authenticate the coordinator to thereby determine according to an authentication result whether to be connected to the coordinator. Therefore, the terminal device can access the wireless multi-hop network with improved security and performance.

2. Both the terminal device and the coordinator have uncontrolled and controlled ports defined and controll the ports according to an authentication result to thereby form a port access control system and improve security of an access of the terminal device to the wireless multi-hop network.

3. The terminal device and the coordinator define a unicast key negotiation process and a multicast key announcement process for different security services to thereby ensure security of communication between the terminal device and the coordinator.

4. In the case of an ID-based authentication and key management suite, a tri-element peer authentication protocol is used so that the trusted center can provide the terminal device and the coordinator with a public key revocation table to enable bidirectional authentication of the terminal device and the coordinator and improve security of an access of the terminal device to the wireless multi-hop network.

5. In the case of an ID-based authentication and key management suite, an ID-based public key per se is characterized by revocation and is short in length, so both the number of public key revocation queries and the communication traffic can be reduced to thereby improve performance of an access of the terminal device to the wireless multi-hop network.

6. In the case of an ID-based authentication and key management suite, information transmitted from the trusted center to the coordinator is transported over a secure channel which can be established without interaction using public and private keys pairs of the coordinator and the trusted center to dispense with a key negotiation process between the coordinator and the trusted center and reduce complexity of information transmitted from the trusted center to the coordinator to thereby improve performance of an access of the terminal device to the wireless multi-hop network.

BRIEF DESCRIPTION OF THE DRAWINGS

The drawings to be used for the descriptions of the embodiments of the invention or in the prior art will be described briefly below to make the technical solutions in the embodiments or in the prior art clearer, and evidently the drawings to be described below are merely illustrative of some embodiments of the invention, and those ordinarily skilled in the art can further derive from these drawings other drawings without any inventive effort.

FIG. 1 is a structural diagram of a network topology of a wireless multi-hop network, where

Reference numerals in FIG. 3, FIG. 4, FIG. 5 and FIG. 6 are defined as follows:

$N_1$ an authentication inquiry of the coordinator;
$N_2$ an authentication inquiry of the terminal device;
$N_3$ a public key revocation query inquiry of the coordinator;
$N_4$ a unicast key negotiation inquiry of the coordinator;
$N_5$ a unicast key negotiation inquiry of the terminal device;
$N_M$ a multicast key announcement identifier;
$HMAC_{CU}$ a message authentication code of the coordinator in unicast key negotiation;
$HMAC_{TU}$ a message authentication code of the terminal device in unicast key negotiation;
$HMAC_{CM}$ a message authentication code of the coordinator in multicast key negotiation;
$HMAC_{TM}$ a message authentication code of the terminal device in multicast key negotiation;
ADDID a concatenated value of MAC addresses of the terminal device and the coordinator;
$P_{ECC}$ ECC domain parameter;
$P_{ID}$ an ID-based public parameter;
$SK_{ID-S}$ a private key of the trusted center;
$PK_{ID-S}$ a public key of the trusted center;
$SK_{ID-T}$ a private key of the terminal device;
$PK_{ID-T}$ a public key of the terminal device;
$SK_{ID-C}$ a private key of the coordinator;
$PK_{ID-C}$ a public key of the coordinator;
$ID_C$ an identifier of the coordinator;
$ID_T$ an identifier of the terminal device;
$ID_{S-CA}$ a body identity of a CA certificate of the trusted center in the wireless multi-hop network;
$ID_{Net}$ an identifier of the wireless multi-hop network;
$TL_{T-PK}$ a period of validity of the public key of the terminal device;
$TL_{C-PK}$ a period of validity of the public key of the coordinator;
$QF_{PK}$ an identifier of a public key revocation query;
$Re_I$ an access result;
$Re_T$ a public key revocation result of the terminal device;
$Re_C$ a public key revocation result of the coordinator;
$Result_{C-PX}$ a result of the public key revocation query of the coordinator;
$Sig_T$ a signature of an authentication request of the terminal device;
$Sig_C$ a signature of an authentication response of the coordinator;
$Sig_S$ a signature of the public key revocation query;
UEK a unicast encryption key;
UCK a unicast integrity check key;
UMAK a unicast message authentication key;
NMK a multicast announcement master key;
$NMK_E$ an encrypted multicast announcement master key;
MEK a multicast encryption key;
MCK a multicast integrity check key;
$N_6$ an authentication inquiry of a pre-shared key of the coordinator;
$N_7$ an authentication inquiry of a pre-shared key of the terminal device;
$HMAC_{CA}$ a message authentication code of the coordinator in a pre-shared key authentication process;
$HMAC_{TA}$ a message authentication code of the terminal device in a pre-shared key authentication process;

DETAILED DESCRIPTION OF THE INVENTION

The technical solutions in the embodiments of the invention will be described clearly and fully below with reference to the drawings in the embodiments of the invention. Evidently, the described embodiments are merely a part but not all of the embodiments of the invention. Based upon the embodiments of the invention, any other embodiments which will occur to those ordinarily skilled in the art without any inventive effort shall fall into the scope of protection of the invention.

The invention is applicable to a secure application protocol in an application of a method of the WLAN Authentication Privacy Infrastructure (WAPI) (an access control method based upon Tri-element Peer Authentication (TePA)) to a specific network including a wireless local area network, a wireless metropolitan area network, etc.

In an authentication access system of a wireless multi-hop network, authentication is for the purpose of establish trustworthiness between a terminal device and a coordinator associated with the terminal device and of protecting data passed over a link between the terminal device and the coordinator. The terminal device and the coordinator associated therewith belong to the same management domain, i.e., the wireless multi-hop network, and a trusted center of the wireless multi-hop network shall configure all the devices in the wireless multi-hop network, for example, configure key information for various authentication and key management suites.

In the authentication access system of the wireless multi-hop network, the coordinator broadcasts a beacon frame, the terminal device identifies authentication and key management suites supported by the coordinator from the beacon frame of the coordinator and then verifies whether the authentication and key management suites in the beacon frame of the coordinator are supported, and if the terminal device supports one of the authentication and key management suites and is provided with key information for this authentication and key management suite, the terminal device transmits a connection request command to the coordinator. If the terminal device supports more than one of the authentication and key management suites in the beacon frame of the coordinator and is provided with key information for these authentication and key management suites, the terminal device selects one of the authentication and key management suites and then transmits a connection request command to the coordinator. The connection request command includes the authentication and key management suite selected by the terminal device.

Upon reception of the connection request command of the terminal device, the coordinator performs an authentication process with the terminal device according to the authentication and key management suite selected by the terminal device and then transmits a connection response command to the terminal device. Upon successful authentication, the coordinator provides the terminal device with an access to the wireless multi-hop network while transmitting the connection response command including some access information, e.g., an allocated network address. If authentication is successful and the coordinator is required to perform unicast key negotiation with the terminal device, the coordinator and the terminal device perform a unicast key negotiation process. If unicast key negotiation is passed and the coordinator is required to perform multicast key negotiation with the terminal device, the coordinator and the terminal device perform a multicast key announcement process.

The terminal device will receive the connection response command transmitted from the coordinator after performing the authentication process with the coordinator, and upon reception of the connection response command of the coordinator, if authentication of the terminal device with the coordinator is successful and the connection response command transmitted from the coordinator includes some access information, the terminal device is connected to the coordinator and thus accesses the wireless multi-hop network. If the terminal device receives a unicast key negotiation request command transmitted from the coordinator after accessing the network, the terminal device and the coordinator perform a unicast key negotiation process. If the terminal device receives a multicast key announcement request command transmitted from the coordinator upon successful completion of the unicast key negotiation process, the terminal device and the coordinator perform a multicast key announcement process.

Both the terminal device and the coordinator have uncontrolled and controlled ports defined and are capable of controlling the ports. The uncontrolled ports can only pass an authentication protocol data packet and management information prior to successful authentication, and the controlled ports can pass an application data packet. The terminal device and the coordinator can only communicate via the uncontrolled ports prior to successful authentication and will not open the controlled ports for communication only if they perform successful authentication.

Figure 2:
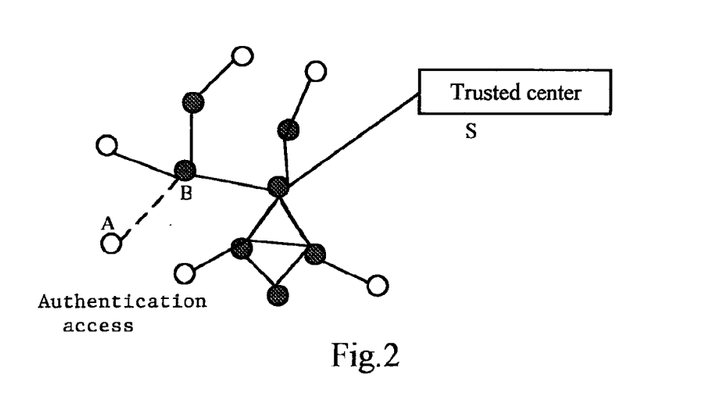
FIG. 2 is a schematic structural diagram of an authentication access system of a wireless multi-hop network, where A represents a terminal device requesting for an authentication access, B represents a coordinator associated with A, and S represents a trusted center of the wireless multi-hop network.

FIG. 2 illustrates an authentication access system of a wireless multi-hop network, where A represents a terminal device requesting for an authentication access, B represents a coordinator associated with A, S represents a trusted center of the wireless multi-hop network, both A and B are required to have key information configured by S, a solid line represents an authentication access state, and a dotted line represents a state in which an authentication access is required.

The foregoing authentication and key management suite can include an authentication and key management suite based upon a pre-shared key and an ID-based authentication and key management suites. Pre-shared keys can fall into three categories: the first category of pre-shared keys refers to a master key shared throughout the wireless multi-hop network, the second category of pre-shared keys refers to a master key shared between the device and the trusted center in the wireless multi-hop network, and the third category of pre-shared keys refers to a master key between the devices in the wireless multi-hop network.

This authentication access method can be applicable to LR-WPAN, HR-WPAN and WSN, which all support such a topology structure of the wireless multi-hop network.

Figure 3:
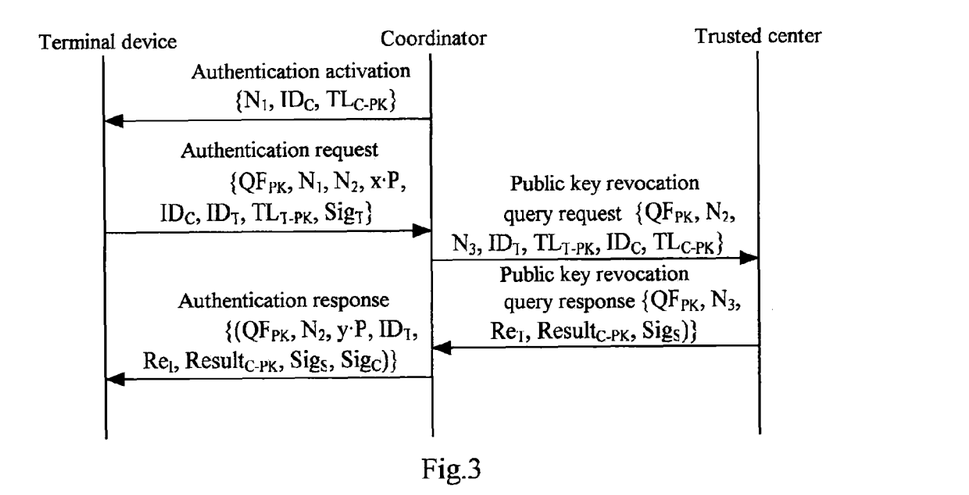
FIG. 3 is a schematic diagram of an ID-based authentication process in a method of the invention.
Figure 7:
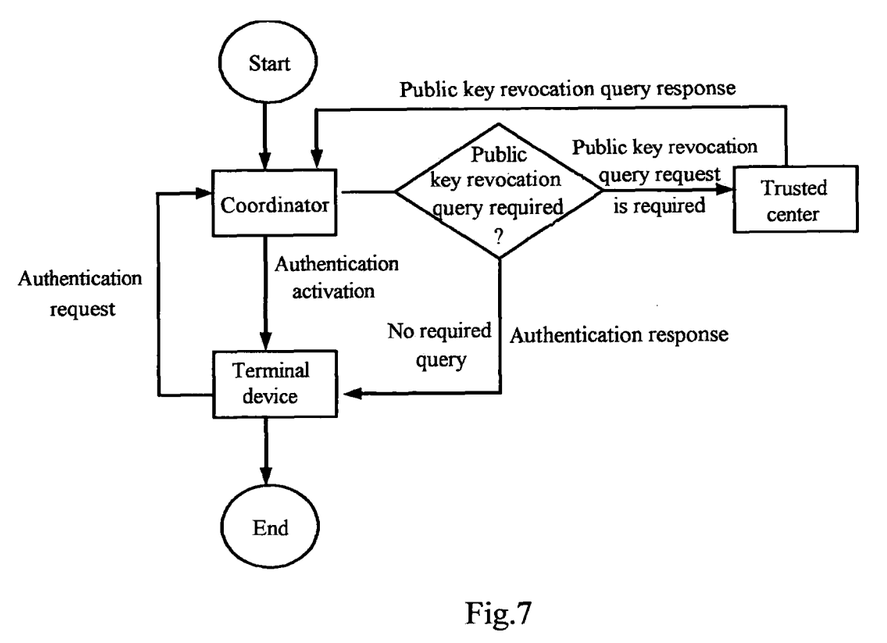
FIG. 7 is a schematic flowchart of an ID-based authentication process in a method of the invention.

When the authentication and key management suite is an ID-based authentication and key management suite, a specific authentication process is as follows with reference to FIG. 3. A schematic flowchart of the authentication process is as illustrated in FIG. 7.

Step 1] when the coordinator knows from the connection request command transmitted from the terminal device that the authentication and key management suite selected by the terminal device is an ID-based authentication and key management suite, the coordinator performs the following process:

a) an authentication inquiry of the coordinator $N_1$, also referred to as a challenge word, a random number, etc., is generated using a random number generator; and b) the authentication inquiry of the coordinator $N_1$, an identifier of the coordinator $ID_C$ and a period of validity of a public key of the coordinator $TL_{C\text{-}PK}$ are transmitted to the terminal device.

Step 2] the terminal device performs the following process upon reception of the information transmitted in the step 1] from the coordinator:

a) the period of validity of a public key of the coordinator $TL_{C\text{-}PK}$ is verified, and the information is discarded upon expiration; otherwise, an authentication inquiry of the terminal device $N_2$ is generated using the random number generator;

b) a temporary private key x and a temporary public key x•P for ECDH exchange are generated from a preinstalled ECC domain parameter $P_{ECC}$;

c) if the terminal device requests for a revocation query of a public key of the coordinator $PK_{ID-C}$, the terminal device sets a bit 0 of an identifier of a public key revocation query $QF_{PK}$ as 1; otherwise, the bit is set as 0;

d) the terminal device uses a private key of the terminal device $SK_{ID-T}$ to perform signature calculation on the identifier of the public key revocation query $QF_{PK}$, the authentication inquiry of the coordinator $N_1$, the authentication inquiry of the terminal device $N_2$, the temporary public key x•P, the identifier of the coordinator $ID_C$, an identifier of the terminal device $ID_T$ and the period of validity of the public key of the coordinator $TL_{T-PK}$ to generate a signature of an authentication request of the terminal device $Sig_T$.

e) The identifier of the public key revocation query $QF_{PK}$, the authentication inquiry of the coordinator $N_1$, the authentication inquiry of the terminal device $N_2$, the temporary public key of the terminal device x•P, the identifier of the coordinator $ID_C$ and last two fields in a public key of the terminal device $PK_{ID-T}$ and the signature of the authentication request of the terminal device $Sig_T$ generated by the terminal device are transmitted to the coordinator.

Step 3] the coordinator performs the following process upon reception of the information transmitted in the step 2] from the terminal device:

a) the authentication inquiry of the coordinator $N_1$ and the identifier of the coordinator $ID_C$ are verified for consistency with the corresponding values transmitted in the step 1], and if they are inconsistent, the information is discarded;

b) a period of validity of the public key of the terminal device $TL_{T-PK}$ is verified, and the information is discarded upon expiration;

c) the last two fields in the public key of the terminal device $PK_{ID-T}$, a body identity of a CA certificate of the trusted center in the wireless multi-hop network $ID_{S-CA}$ and an identifier of the wireless multi-hop network $ID_{Net}$ are concatenated into the public key of the terminal device $PK_{ID-T}$, and then the signature of the authentication request of the terminal device $Sig_T$ is verified using the public key of the terminal device $PK_{ID-T}$ and a preinstalled identity-based public parameter $P_{ID}$, and if verification of the signature fails, the information is discarded;

d) the bit 0 of the identifier of the public key revocation query $QF_{PK}$ is checked, and if the bit 0 is 1, the process goes to the operation e); otherwise, the process goes to the operation f);

e) a public key revocation query inquiry of the coordinator $N_3$ is generated in a random number generation algorithm. If the coordinator also requests for a revocation query of the public key of the terminal device $PK_{ID-T}$, the coordinator sets a bit 1 of the identifier of the public key revocation query $QF_{PK}$ as 1 and transmits the identifier of the public key revocation query $QF_{PK}$, the authentication inquiry of the terminal device $N_2$, the public key revocation query inquiry of the coordinator $N_3$, the identifier of the terminal device $ID_T$, the period of validity of the public key of the terminal device $TL_{T-PK}$, the identifier of the coordinator $ID_C$ and the period of validity of the public key of the coordinator $TL_{C-PK}$ to the trusted center; otherwise, the coordinator sets the bit 1 of the identifier of the public key revocation query $QF_{PK}$ as 0 and transmits the identifier of the public key revocation query $QF_{PK}$, the authentication inquiry of the terminal device $N_2$, the public key revocation query inquiry of the coordinator $N_3$, the identifier of the coordinator $ID_C$ and the period of validity of the public key of the coordinator $TL_{C-PK}$ to the trusted center; and f) if the coordinator requests for a revocation query of the public key of the terminal device $PK_{ID-T}$, the coordinator sets the bit 1 of the identifier of the public key revocation query $QF_{PK}$ as 1, generates the public key revocation query inquiry of the coordinator $N_3$ in the random number generation algorithm and transmits the identifier of the public key revocation query $QF_{PK}$, the public key revocation query inquiry of the coordinator $N_3$, the identifier of the terminal device $ID_T$ and the period of validity of the public key of the terminal device $TL_{T-PK}$ to the trusted center; otherwise, the coordinator sets the bit 1 of the identifier of the public key revocation query $QF_{PK}$ as 0, generates a temporary private key y and a temporary public key y•P for ECDH exchange using the preinstalled ECC domain parameter $P_{ECC}$, uses its own temporary private key y and the temporary public key x•P transmitted in the step 2 from the terminal device to perform ECDH calculation to derive a master key seed $(x•y•P)_{abscissa}$, the master key seed is expanded through KD-HMAC-SHA256 $((x•y•P))_{abscissa}$, $N_1 \| N_2 \|$"base key expansion for key and additional nonce") into a base key BK between the terminal device and the coordinator, generates an access result $Re_I$, uses a private key of the coordinator $SK_{ID-C}$ to perform signature calculation on the identifier of the public key revocation query $QF_{PK}$, the authentication inquiry of the terminal device $N_2$, the temporary public key y•P, the identifier of the terminal device $ID_T$ and the access result $Re_I$ to generate a signature of an authentication response of the coordinator $Sig_C$ and transmits the identifier of the public key revocation query $QF_{PK}$, the authentication inquiry of the terminal device $N_2$, the temporary public key y•P, the identifier of the terminal device $ID_T$, the access result $Re_I$ and the signature of the authentication response of the coordinator $Sig_C$ generated by the coordinator to the terminal device, and then the process goes to the step 6].

Step 4] the trusted center performs the following process upon reception of the information transmitted in the step 3] from the coordinator:

a) the bit 0 and the bit 1 of the identifier of the public key revocation query $QF_{PK}$ are checked, and if both the bit 0 and the bit 1 are 1, the process goes to the operation b); if the bit 0 is 0 and the bit 1 is 0, the process goes to the operation c); or if the bit 0 is 0 and the bit 1 is 1, the process goes to the operation d);

b) the body identity of the CA certificate of the trusted center in the wireless multi-hop network $ID_{S-CA}$, the identifier of the wireless multi-hop network $ID_{Net}$, the identifier of the terminal device $ID_T$ and the period of validity of the public key of the terminal device $TL_{T-PK}$ are concatenated into the public key of the terminal device $PK_{ID-T}$, the body identity of the CA certificate of the trusted center in the wireless multi-hop network $ID_{S-CA}$, the identifier of the wireless multi-hop network $ID_{Net}$, the identifier of the coordinator $ID_C$ and the period of validity of the public key of the coordinator $TL_{C-PK}$ are concatenated into the public key of the coordinator $PK_{ID-C}$, and then an ID-based public key revocation table of the wireless multi-hop network in the trusted center is searched, a public key revocation result of the terminal device $Re_T$ and a result of the public key revocation query of the coordinator $Result_{C-PK}$ are generated, a private key of the trusted center $SK_{ID-S}$ is used to perform signature calculation on the result of the public key revocation query of the coordinator $Result_{C-PK}$ to generate a signature of the public key revocation query $Sig_S$, and the identifier of the public key revocation query $QF_{PK}$, the public key revocation query inquiry of the coordinator $N_3$, the public key revocation result of the terminal device $Re_T$, the result of the public key revocation query of the coordinator $Result_{C-PK}$ and the signature of the public key revocation query $Sig_S$ are transmitted to the coordinator. The result of the public key revocation query of the coordinator $Result_{C-PK}$ is constituted of the authentication inquiry of the terminal device $N_2$, a public key revocation result of the coordinator $Re_C$, the identifier of the coordinator $ID_C$ and the period of validity of the public key of the coordinator $TL_{C-PK}$;

c) the body identity of the CA certificate of the trusted center in the wireless multi-hop network $ID_{S-CA}$, the identifier of the wireless multi-hop network $ID_{Net}$, the identifier of the coordinator $ID_C$ and the period of validity of the public key of the coordinator $TL_{C-PK}$ are concatenated into the public key of the coordinator $PK_{ID-C}$, and then the identity-based public key revocation table of the wireless multi-hop network in the trusted center is searched, the result of the public key revocation query of the coordinator $Result_{C-PK}$ are generated, the private key of the trusted center $SK_{ID-S}$ is used to perform signature calculation on the result of the public key revocation query of the coordinator $Result_{C-PK}$ to generate a signature of the public key revocation query $Sig_S$, and the identifier of the public key revocation query $QF_{PK}$, the public key revocation query inquiry of the coordinator $N_3$, the result of the public key revocation query of the coordinator $Result_{C-PK}$ and the signature of the public key revocation query $Sig_S$ are transmitted to the coordinator;

d) the body identity of the CA certificate of the trusted center in the wireless multi-hop network $ID_{S-CA}$, the identifier of the wireless multi-hop network $ID_{Net}$, the identifier of the terminal device $ID_T$ and the period of validity of the public key of the terminal device $TL_{T-PK}$ are concatenated into the public key of the terminal device $PK_{ID-T}$, and then the identity-based public key revocation table of the wireless multi-hop network in the trusted center is searched, the public key revocation result of the terminal device $Re_T$ are generated, and the identifier of the public key revocation query $QF_{PK}$, the public key revocation query inquiry of the coordinator $N_3$ and the public key revocation result of the terminal device $Re_T$ are transmitted to the coordinator.

The information transmitted from the trusted center to the coordinator is transmitted between the coordinator and the trusted center and over a secure channel which can be established by the coordinator and the trusted center without interaction, for example, the coordinator generates a session key using its own private key and a public key of the trusted center, and the trusted center generates a session key using its own private key and the public key of the coordinator.

Step 5] the coordinator performs the following process upon reception of the information transmitted in the step 4] from the trusted center:

a) the identifier of the public key revocation query $QF_{PK}$ and the public key revocation query inquiry of the coordinator $N_3$ are verified for consistency with the corresponding values transmitted in the step 3 from the coordinator, and if they are inconsistent, the information is discarded; otherwise, the bit 0 and the bit 1 of the identifier of the public key revocation query $QF_{PK}$ are checked, and if both the bit 0 and the bit 1 are 1, the process goes to the step b); if the bit 0 is 1 and the bit 1 is 0, the process goes to the operation c); or if the bit 0 is 0 and the bit 1 is 1, the process goes to the operation d);

b) the public key revocation result of the terminal device $Re_T$ is verified. If the public key of the terminal device $PK_{ID-T}$ has been revoked, the authentication process is terminated; otherwise, after performing the operation e), the coordinator uses the private key of the coordinator $SK_{ID-C}$ to perform signature calculation on the identifier of the public key revocation query $QF_{PK}$, the authentication inquiry of the terminal device $N_2$, the temporary public key y•P, the identifier of the terminal device $ID_T$, the access result $Re_I$, the result of the public key revocation query of the coordinator $Result_{C-PK}$ and the signature of the public key revocation query $Sig_S$ to generate the signature of the authentication response of the coordinator $Sig_C$ and transmits the identifier of the public key revocation query $QF_{PK}$, the authentication inquiry of the terminal device $N_2$, the temporary public key of the coordinator y•P, the identifier of the terminal device $ID_T$, the access result $Re_I$, the result of the public key revocation query of the coordinator $Result_{C-PK}$, the signature of the public key revocation query $Sig_S$ and the signature of the authentication response of the coordinator $Sig_C$ to the terminal device;

c) after performing the operation e), the coordinator uses the private key of the coordinator $SK_{ID-C}$ to perform signature calculation on the identifier of the public key revocation query $QF_{PK}$, the authentication inquiry of the terminal device $N_2$, the temporary public key y•P, the identifier of the terminal device $ID_T$, the access result $Re_I$, the result of the public key revocation query of the coordinator $Result_{C-PK}$ and the signature of the public key revocation query $Sig_S$ to generate the signature of the authentication response of the coordinator $Sig_C$ and transmits the identifier of the public key revocation query $QF_{PK}$, the authentication inquiry of the terminal device $N_2$, the temporary public key y•P, the identifier of the terminal device $ID_T$, the access result $Re_I$, the result of the public key revocation query of the coordinator $Result_{C-PK}$, the signature of the public key revocation query $Sig_S$ and the signature of the authentication response of the coordinator $Sig_C$ to the terminal device;

d) the public key revocation result of the terminal device $Re_T$ is verified. If the public key of the terminal device $PK_{ID-T}$ has been revoked, the authentication process is terminated; otherwise, after performing the operation e), the coordinator uses the private key of the coordinator $SK_{ID-C}$ to perform signature calculation on the identifier of the public key revocation query $QF_{PK}$, the authentication inquiry of the terminal device $N_2$, the temporary public key y•P, the identifier of the terminal device $ID_T$ and the access result $Re_I$ to generate the signature of the authentication response of the coordinator $Sig_C$ and transmits the identifier of the public key revocation query $QF_{PK}$, the authentication inquiry of the terminal device $N_2$, the temporary public key y•P, the identifier of the terminal device $ID_T$, the access result $Re_I$ and the signature of the authentication response of the coordinator $Sig_C$ to the terminal device;

e) the temporary private key y and the temporary public key y•P for ECDH exchange are generated using the preinstalled ECC domain parameter $P_{ECC}$, and its own temporary private key y and the temporary public key x•P transmitted in the step 2 from the terminal device are used to perform ECDH calculation to derive the master key seed $(x•y•P)_{abscissa}$, which is expanded through KD-HMAC-SHA256 $((x•y•P)_{abscissa}, N_1\|N_2\|$"base key expansion for key and additional nonce") into the base key BK between the terminal device and the coordinator while generating the access result $Re_I$.

Step 6] the terminal device performs the following process upon reception of the information transmitted in the step 3] or the step 5] from the coordinator:

a) the authentication inquiry of the terminal device $N_2$, the identifier of the terminal device $ID_T$ and the bit 0 of the identifier of the public key revocation query $QF_{PK}$ are verified for consistency with the corresponding values transmitted in the step 2] from the terminal device, and if they are inconsistent, the information is discarded;

b) the body identity of the CA certificate of the trusted center in the wireless multi-hop network $ID_{S\text{-}CA}$, the identifier of the wireless multi-hop network $ID_{Net}$, the identifier of the coordinator $ID_C$ and the period of validity of the public key of the coordinator $TL_{C\text{-}PK}$ are concatenated into the public key of the coordinator $PK_{ID\text{-}C}$, the signature of the authentication response of the coordinator $Sig_C$ is verified using the public key of the coordinator $PK_{ID\text{-}C}$ and the preinstalled identity-based public parameter $P_{ID}$, and if signature verification fails, the information is discarded;

c) if the bit 0 of the identifier of the public key revocation query $QF_{PK}$ is 1, the process goes to the operation d); otherwise, the process goes to the step e);

d) the signature of the public key revocation query $Sig_S$ is verified using a public key of the trusted center $PK_{ID\text{-}s}$ and the preinstalled identity-based public parameter $P_{ID}$, and if signature verification fails, the information is discarded; otherwise, the authentication inquiry of the terminal device $N_2$, the identifier of the coordinator $ID_C$ and the period of validity of the public key of the coordinator $TL_{C\text{-}PK}$ in the result of the public key revocation query of the coordinator $Result_{C\text{-}PK}$ are verified for consistency along with the public key revocation result of the coordinator $Re_C$ is verified. If consistency is satisfied and the public key of the coordinator has not been revoked, the process goes to the operation e); otherwise, the information is discarded;

e) the terminal devices uses its own temporary private key x and the temporary public key y•P of the coordinator to perform ECDH operation to derive the master key seed $(x \cdot y \cdot P)_{abscissa}$ expanded through KD-HMAC-SHA256 $((x \cdot y \cdot P)_{abscissa}, N_1 \| N_2 \| \text{``base key expansion for key and additional nonce''})$ into the base key BK between the terminal device and the coordinator.

When the authentication and key management suite is an ID-based authentication and key management suite, a specific process of unicast key negotiation is implemented as follows with reference to FIG. 4.

Step 1] upon successful authentication, the coordinator performs the following process to create or update a unicast key:

The coordinator generates a unicast key negotiation inquiry of the coordinator $N_4$ using the random number generator and transmits the unicast key negotiation inquiry of the coordinator $N_4$ to the terminal device;

Step 2] the terminal device performs the following process upon reception of the information transmitted in the step 1] from the coordinator:

a) MAC addresses of the terminal device and the coordinator are concatenated into a concatenated value of the MAC addresses of the terminal device and the coordinator ADDID;

b) the terminal device generates a unicast key negotiation inquiry of the terminal device $N_5$ using the random number generator and then calculates KD-HMAC-SHA256 (BK, ADDID$\|N_4\|N_5\|$"pairwise key expansion for unicast and additional keys and nonce") to generate a unicast encryption key UEK, a unicast integrity check key UCK and a unicast message authentication key UMAK. The BK is the base key BK between the terminal device and the coordinator generated during authentication.

c) the unicast message authentication key UMAK is used to perform message authentication code calculation on the unicast key negotiation inquiry of the coordinator $N_4$ and the unicast key negotiation inquiry of the terminal device $N_5$ in the HMAC-SHA256 algorithm to generate a message authentication code of the terminal device in unicast key negotiation $HMAC_{TU}$, and then the unicast key negotiation inquiry of the coordinator $N_4$, the unicast key negotiation inquiry of the terminal device $N_5$ and the message authentication code of the terminal device in unicast key negotiation $HMAC_{TU}$ are transmitted to the coordinator.

Step 3] the coordinator performs the following process upon reception of the information transmitted in the step 2] from the terminal device.

a) the unicast key negotiation inquiry of the coordinator $N_4$ is verified for consistency, and if it is inconsistent, the information is discarded;

b) the MAC addresses of the terminal device and the coordinator are concatenated into the concatenated value of the MAC addresses of the terminal device and the coordinator;

c) KD-HMAC-SHA256 (BK, ADDID$\|N_4\|N_5\|$"pairwise key expansion for unicast and additional keys and nonce") is calculated to generate the unicast encryption key UEK, the unicast integrity check key UCK and the unicast message authentication key UMAK. The BK is the base key BK between the terminal device and the coordinator generated during authentication. The generated unicast message authentication key UMAK is used to calculate locally a message authentication code of the unicast key negotiation inquiry of the coordinator $N_4$ and the unicast key negotiation inquiry of the terminal device $N_5$ in the HMAC-SHA256 algorithm, the message authentication code is compared with the message authentication code of the terminal device in unicast key negotiation $HMAC_{TU}$ in the received information, and if they are identical, the process performs the operation d); otherwise, the information is discarded.

d) the unicast message authentication key UMAK generated by the coordinator is used to perform message authentication code calculation on the unicast key negotiation inquiry of the terminal device $N_5$ in the HMAC-SHA256 algorithm to generate a message authentication code of the coordinator in unicast key negotiation $HMAC_{CU}$, and then the unicast key negotiation inquiry of the terminal device $N_5$ and the message authentication code of the coordinator in unicast key negotiation $HMAC_{CU}$ are transmitted to the terminal device.

Step 4] the terminal device performs the following process upon reception of the information transmitted in the step 3] from the coordinator.

a) the unicast key negotiation inquiry of the terminal device $N_5$ is verified for consistency, and if it is inconsistent, the information is discarded;

b) the locally generated unicast message authentication key UMAK is used to calculate locally a message authentication code of the unicast key negotiation inquiry of the terminal device $N_5$ in the HMAC-SHA256 algorithm, the message authentication code is compared with the message authentication code of the coordinator in unicast key negotiation $HMAC_{CU}$ in the received information, and if they are identical, the unicast key negotiation is successful; otherwise, the information is discarded.

When the authentication and key management suite is an ID-based authentication and key management suite, a specific process of multicast key negotiation is implemented as follows with reference to FIG. 5.

Step 1] upon successful unicast key negotiation, the coordinator performs the following process to create or update a multicast key:

a) a multicast key announcement identifier $N_M$ and a multicast announcement master key NMK are generated using the random number generator;

b) the multicast announcement master key NMK is encrypted with the unicast encryption key UEK between the coordinator and the terminal device;

c) the unicast message authentication key UMAK between the coordinator and the terminal device is used to perform message authentication code calculation on the multicast key announcement identifier $N_M$ and the encrypted multicast announcement master key $NMK_E$ in the HMAC-SHA256 algorithm to derive a message authentication code of the coordinator in multicast key negotiation $HMAC_{CM}$, where the multicast key announcement identifier $N_M$ is an integer with an initial value which is incremented by one upon each key update announcement but which will be unchanged if the announced key is unchanged.

d) the multicast key announcement identifier $N_M$, the encrypted multicast announcement master key $NMK_E$ and the message authentication code of the coordinator in multicast key negotiation $HMAC_{CM}$ are transmitted to the terminal device.

Step 2] the terminal device performs the following process upon reception of the information transmitted in the step 1] from the coordinator:

a) the unicast message authentication key UMAK between the coordinator and the terminal device is used to calculate locally a message authentication code of the multicast key announcement identifier $N_M$ and the encrypted multicast announcement master key $NMK_E$ in the HMAC-SHA256 algorithm, the message authentication code is compared with the message authentication code of the coordinator in multicast key negotiation $HMAC_{CM}$ in the received information, and if they are different, the information is discarded;

b) it is checked whether the multicast key announcement identifier $N_M$ is incremented monotonically, and if not, the information is discarded;

c) the encrypted multicast announcement master key $NMK_E$ is decrypted with the Unicast encryption key UEK between the coordinator and the terminal device into the multicast announcement master key NMK which is expanded in the KD-HMAC-SHA256 algorithm to generate a multicast encryption key MEK and a multicast integrity check key MCK;

d) the unicast message authentication key UMAK between the coordinator and the terminal device is used to perform message authentication code calculation on the multicast key announcement identifier $N_M$ in the HMAC-SHA256 algorithm to derive a message authentication code of the terminal device in multicast key negotiation $HMAC_{TM}$;

e) the multicast key announcement identifier $N_M$ and the message authentication code of the terminal device in multicast key negotiation $HMAC_{TM}$ are transmitted to the coordinator.

Step 3] the coordinator performs the following process upon reception of the information transmitted in the step 2] from the terminal device:

a) the unicast message authentication key UMAK between the coordinator and the terminal device is used to calculate locally a message authentication code of the multicast key announcement identifier $N_M$ in the HMAC-SHA256 algorithm, the message authentication code is compared with the message authentication code of the terminal device in multicast key negotiation $HMAC_{TM}$ in the received information, and if they are different, the information is discarded;

b) the multicast key announcement identifier $N_M$ is compared with the corresponding value transmitted in the step 1 from the coordinator, and if they are identical, the current multicast key negotiation is successful; otherwise, the information is discarded;

c) the generated multicast announcement master key NMK is expanded in the KD-HMAC-SHA256 algorithm to generate the multicast encryption key MEK and the multicast integrity check key MCK Upon authentication access of the terminal device, the terminal device and the trusted center use the public and private keys to establish a secure channel for ID-based key sharing without interaction. When the terminal device performs an authentication access as the coordinator, the established secure channel can also protect communication between the negotiator and the trusted center during authentication.

When the authentication and key management suite is an authentication and key management suite based upon a pre-shared key, a specific authentication process is implemented as follows with reference to FIG. 6.

Step 1] when the coordinator knows from the connection request command transmitted from the terminal device that the authentication and key management suite selected by the terminal device is an authentication and key management suite based upon a pre-shared key as well as the category of the pre-shared key, the coordinator performs the following process:

the coordinator expands a locally stored shared key between the coordinator and the terminal device in KD-HMAC-SHA256 into the corresponding base key BK, and then generates an authentication inquiry of the pre-shared key of the coordinator $N_6$ using the random number generator and transmits the authentication inquiry of the pre-shared key of the coordinator $N_6$ to the terminal device. If the pre-shared key is of the first and second categories, the locally stored shared key between the coordinator and the terminal device as used above is of the first category of pre-shared keys; otherwise, it is of the third category of pre-shared keys;

Step 2] the terminal device performs the following process upon reception of the information transmitted in the step 1] from the coordinator:

a) the terminal device expands the locally stored shared key between the terminal device and the coordinator in KD-HMAC-SHA256 into the corresponding base key BK. If the pre-shared key is of the first and second categories, the locally stored shared key between the coordinator and the terminal device as used above is of the first category of pre-shared keys; otherwise, it is of the third category of pre-shared keys;

b) the MAC addresses of the terminal device and the coordinator are concatenated into the concatenated value of the MAC addresses of the terminal device and the coordinator ADDID;

c) the terminal device generates an authentication inquiry of the pre-shared key of the terminal device $N_7$ using the random number generator and then calculates KD-HMAC-SHA256 (BK, ADDID$\|N_6\|N_7\|$"pairwise key expansion for unicast and additional keys and nonce") to generate the unicast encryption key UEK, the unicast integrity check key UCK and the unicast message authentication key UMAK.

d) the unicast message authentication key UMAK is used to perform message authentication code calculation on the authentication inquiry of the pre-shared key of the coordinator $N_6$ and the authentication inquiry of the pre-shared key of the terminal device $N_7$ in the HMAC-SHA256 algorithm to generate a message authentication code of the terminal device in pre-shared key authentication $HMAC_{T4}$, and then the authentication inquiry of the pre-shared key of the coordinator $N_6$, the authentication inquiry of the pre-shared key of the terminal device $N_7$ and the message authentication code of the terminal device in pre-shared key authentication $HMAC_{T4}$ are transmitted to the coordinator.

Step 3] the coordinator performs the following process upon reception of the information transmitted in the step 2] from the terminal device.

a) the authentication inquiry of the pre-shared key of the coordinator $N_6$ is verified for consistency, and if it is inconsistent, the information is discarded;

b) the MAC addresses of the terminal device and the coordinator are concatenated into the concatenated value of the MAC addresses of the terminal device and the coordinator ADDID;

c) KD-HMAC-SHA256 (BK, ADDID∥$N_6$∥$N_7$∥"pairwise key expansion for unicast and additional keys and nonce") is calculated to generate the unicast encryption key UEK, the unicast integrity check key UCK and the unicast message authentication key UMAK. The generated unicast message authentication key UMAK is used to calculate locally a message authentication code of the authentication inquiry of the pre-shared key of the coordinator $N_6$ and the authentication inquiry of the pre-shared key of the terminal device $N_7$ in the HMAC-SHA256 algorithm, the message authentication code is compared with the message authentication code of the terminal device in pre-shared key authentication HMAC$_{TA}$ in the received information, and if they are identical, the process performs the operation d); otherwise, the information is discarded.

d) the unicast message authentication key UMAK generated by the coordinator is used to perform message authentication code calculation on the authentication inquiry of the pre-shared key of the terminal device $N_7$ in the HMAC-SHA256 algorithm to generate a message authentication code of the coordinator in pre-shared key authentication HMAC$_{TA}$, and then the authentication inquiry of the pre-shared key of the terminal device $N_7$ and the message authentication code of the coordinator in pre-shared key authentication HMAC$_{TA}$ are transmitted to the terminal device.

Step 4] the terminal device performs the following process upon reception of the information transmitted in the step 3] from the coordinator.

a) the authentication inquiry of the pre-shared key of the terminal device $N_7$ is verified for consistency, and if it is inconsistent, the information is discarded;

b) the locally generated unicast message authentication key UMAK is used to calculate locally a message authentication code of the authentication inquiry of the pre-shared key of the terminal device $N_7$ in the HMAC-SHA256 algorithm, the message authentication code is compared with the message authentication code HMAC$_{TA}$ of the coordinator in pre-shared key authentication in the received information, and if they are identical, the authentication is successful; otherwise, the information is discarded.

Figure 4:
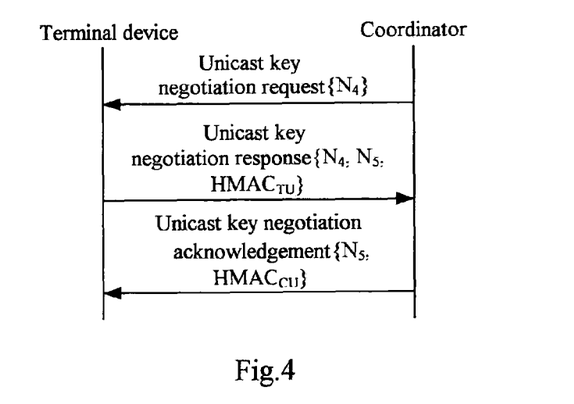
FIG. 4 is a schematic diagram of an ID-based unicast key negotiation process in a method of the invention.
Figure 6:
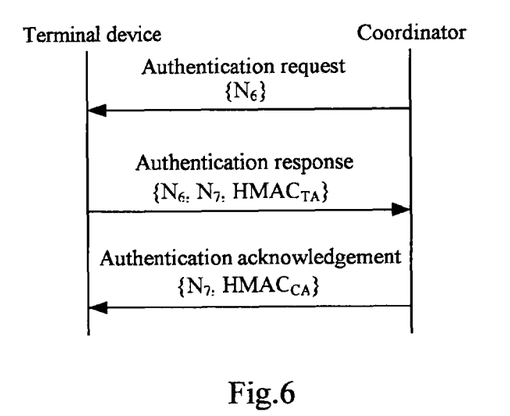
FIG. 6 is a schematic diagram of an authentication process based upon a pre-shared key in a method of the invention.

When the authentication and key management suite is an authentication and key management suite based upon a pre-shared key, if the coordinator and the terminal device perform unicast key negotiation for the first time, the unicast key negotiation process is the same as the authentication process, a specific implementation of which is as illustrated in FIG. 6; otherwise the unicast key negotiation process is the same as the unicast key negotiation process based upon an ID, a specific implementation of which is as illustrated in FIG. 4.

Figure 5:
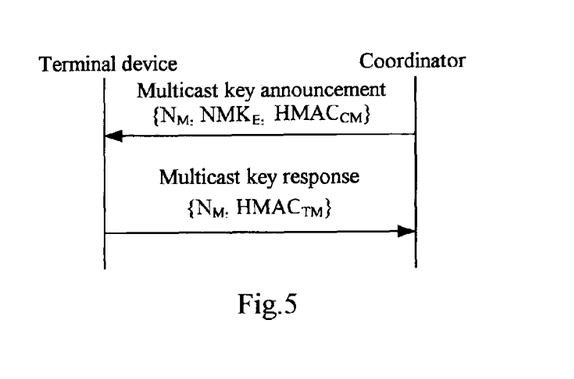
FIG. 5 is a schematic diagram of a multicast key negotiation process in a method of the invention.

When the authentication and key management suite is an authentication and key management suite based upon a pre-shared key, the multicast key announcement process is the same as the multicast key announcement process based upon an ID, a specific implementation of which is as illustrated in FIG. 5.

It shall be noted that the authentication access system of a wireless multi-hop network disclosed as above in the embodiments of the invention also falls into the scope of protection of the invention.

Those skilled in the art can appreciate that information, a message and a signal can be represented in any of various different processes and technologies. For example, the message and information mentioned in the foregoing description can be represented as any one or combination of a voltage, current, electromagnetic wave, magnetic field or magnetic particle and optical field.

Those skilled in the art can further appreciate that the units and algorithm steps in the respective examples described in connection with the embodiments disclosed in this context can be implemented in electronic hardware, computer software or a combination of both. In order to clarify interchangeability of hardware and software, the components and steps of the respective examples have been functionally described in general in the foregoing description. These functions can be performed in hardware or software dependent upon a specific application and design constrain condition of a technical solution. Those skilled in the art can enable the described functions to be performed in different methods for respective specific applications without departing from the scope of the invention.

Those ordinarily skilled in the art can appreciate that all or a part of the flow(s) in the foregoing embodiments of the method can be performed with computer program instructing relevant hardware, where the computer program can be stored in a computer readable storage medium and when being executed the computer program can include the flow(s) in the foregoing embodiments of the method. The storage medium can be a magnetic disk, an optical disk, a Read-Only Memory (ROM), a Random Access Memory (RAM), etc. Those skilled in the art can implement or utilize the invention in light of the foregoing description of the disclosed embodiments. Various modifications to these embodiments will be apparent to those skilled in the art, and the general principle defined in this context can be put into practice in other embodiments without departing from the spirit or scope of the invention. Accordingly, the invention will not be limited to these embodiments disclosed in this context but will be accorded with the broadest scope consistent with the principle and novel features disclosed in this context.

What is claimed is:

1. An authentication access method applicable to a wireless multi-hop network, comprising:

defining an uncontrolled port and a controlled port of a terminal device and a coordinator, wherein the uncontrolled port pass an authentication protocol data packet and management information and the controlled port pass an application data packet;

broadcasting, by the coordinator, a beacon frame comprising authentication and key management suites supported by the coordinator;

selecting, by the terminal device upon reception of the beacon frame of the coordinator, one of the authentication and key management suites, and then transmitting to the coordinator a connection request command comprising the authentication and key management suites selected by the terminal device;

performing, by the coordinator upon reception of the connection request command of the terminal device, an authentication process with the terminal device according to the authentication and key management suites selected by the terminal device; and upon successful authentication, opening the controlled port to allow an access of the terminal device to the wireless multi-hop network while transmitting a connection response command to the terminal device; and opening, by the terminal device upon reception of the connection response command of the coordinator, the controlled port to thereby access the wireless multi-hop network;

wherein the authentication and key management suites comprise an authentication and key management suite based upon a pre-shared key and an ID-based authentication and key management suit, and wherein the authentication process comprises:

A. when the coordinator knows from the connection request command transmitted from the terminal device that the authentication and key management suite selected by the terminal device is an ID-based authentication and key management suite, generating an authentication inquiry of the coordinator, and transmitting an authentication activation consisting of the authentication inquiry of the coordinator and a public key of the coordinator to the terminal device;

B. when validity verification of the public key of the coordinator is passed, generating, by the terminal device upon reception of the authentication activation, an authentication inquiry of the terminal device, an identifier of a public key revocation query and a temporary public key of the terminal device, and transmitting an authentication request consisting of the authentication inquiry of the terminal device, the authentication inquiry of the coordinator, a public key of the terminal device, the identifier of the public key revocation query, the temporary public key of the terminal device and a signature of the terminal device on the above five items of information to the coordinator;

C. verifying, by the coordinator upon reception of the authentication request, the signature of the authentication request for legality, the authentication inquiry of the coordinator for consistency and the temporary public key of the terminal device for validity; when verification is passed, determining according to the identifier of the public key revocation query whether to perform the public key revocation query; if the public key revocation query is not to be performed, generating a temporary public key of the coordinator and an access result, then transmitting, by the coordinator, an authentication response consisting of the identifier of the public key revocation query, the authentication inquiry of the terminal device, the temporary public key of the coordinator, the access result and a signature of the coordinator on the above four items of information to the terminal device, and then performing step G; or if the public key revocation query is to be performed, transmitting a public key revocation query request;

D. verifying, by a trusted center upon reception of the public key revocation query request, the information of the public key revocation query request, and then transmitting a public key revocation query response to the coordinator;

E. verifying, by the coordinator upon reception of the public key revocation query response, the information of the public key revocation query response, and then transmitting the authentication response to the terminal device; and also generating a base key between the terminal device and the coordinator according to the temporary public key of the terminal device and a temporary private key of the coordinator;

F. verifying, by the terminal device upon reception of the authentication response, the information of the authentication response, wherein if verification fails, the authentication fails; otherwise, the terminal device generates the base key between the terminal device and the coordinator according to the temporary public key of the terminal device and the temporary private key of the coordinator and the authentication is successful; and G. verifying, by the terminal device upon reception of the authentication response transmitted in the step C from the coordinator, the signature of the authentication response for validity, the authentication inquiry of the terminal device for consistency and the access result, wherein if verification fails, the authentication fails; otherwise, the terminal device generates the base key between the terminal device and the coordinator according to the temporary public key of the terminal device and the temporary private key of the coordinator and the authentication is successful.

2. The method according to claim 1, further comprising:
performing, by the terminal device upon successful connection to the coordinator, unicast key negotiation with the coordinator.

3. The method according to claim 2, wherein the unicast key negotiation is performed in following steps of:

when a unicast key is required to be created or updated, generating, by the coordinator upon successful authentication, a unicast key negotiation inquiry of the coordinator, and transmitting a unicast key negotiation request consisting of the unicast key negotiation inquiry of the coordinator to the terminal device;

generating, by the terminal device upon reception of the unicast key negotiation request, a unicast key negotiation inquiry of the terminal device, generating a unicast key between the terminal device and the coordinator according to the base key, the unicast key negotiation inquiry of the coordinator and the unicast key negotiation inquiry of the terminal device, and then transmitting to the coordinator a unicast key negotiation response consisting of the unicast key negotiation inquiry of the coordinator, the unicast key negotiation inquiry of the terminal device and a message authentication code, wherein the message authentication code is calculated by the terminal device according to the unicast key negotiation inquiry of the coordinator and the unicast key negotiation inquiry of the terminal device;

calculating, by the coordinator upon reception of the unicast key negotiation response, the unicast key according to the base key, the unicast key negotiation inquiry of the coordinator and the unicast key negotiation inquiry of the terminal device, then verifying the unicast key negotiation inquiry of the coordinator for consistency and the message authentication code of the terminal device for validity, wherein if verification fails, the unicast key negotiation fails; otherwise, the coordinator transmits a unicast key negotiation acknowledgement consisting of the unicast key negotiation inquiry of the coordinator and the message authentication code calculated on the unicast key negotiation inquiry of the terminal device to the terminal device; and verifying, by the terminal device upon reception of the unicast key negotiation acknowledgement, the unicast key negotiation inquiry of the terminal device for consistency and the message authentication code of the coordinator for validity, wherein if verification fails, the unicast key negotiation fails; otherwise, the unicast key negotiation is successful.

4. An authentication access method applicable to a wireless multi-hop network, comprising:

defining an uncontrolled port and a controlled port of a terminal device and a coordinator, wherein the uncontrolled port pass an authentication protocol data packet and management information and the controlled port pass an application data packet;

broadcasting, by the coordinator, a beacon frame comprising authentication and key management suites supported by the coordinator;

selecting, by the terminal device upon reception of the beacon frame of the coordinator, one of the authentication and key management suites, and then transmitting to the coordinator a connection request command comprising the authentication and key management suites selected by the terminal device;

performing, by the coordinator upon reception of the connection request command of the terminal device, an authentication process with the terminal device according to the authentication and key management suites selected by the terminal device; and upon successful authentication, opening the controlled port to allow an access of the terminal device to the wireless multi-hop network while transmitting a connection response command to the terminal device; and opening, by the terminal device upon reception of the connection response command of the coordinator, the controlled port to thereby access the wireless multi-hop network;

wherein the authentication and key management suites comprise an authentication and key management suite based upon a pre-shared key and an ID-based authentication and key management suit, and wherein the authentication process comprises:

a. when the coordinator knows from the connection request command transmitted from the terminal device that the authentication and key management suite selected by the terminal device is an authentication and key management suite based upon a pre-shared key, expanding, by the coordinator, a locally stored pre-shared key between the coordinator and the terminal device into a corresponding base key, generating an authentication inquiry of a pre-shared key of the coordinator, and then transmitting an authentication request consisting of the authentication inquiry of the pre-shared key of the coordinator to the terminal device;

b. firstly expanding, by the terminal device upon reception of the authentication request, the locally stored pre-shared key between the coordinator and the terminal device into the corresponding base key, generating an authentication inquiry of a pre-shared key of the terminal device, generating a unicast key between the terminal device and the coordinator according to the base key, the authentication inquiry of the pre-shared key of the coordinator and the authentication inquiry of the pre-shared key of the terminal device, and then transmitting to the coordinator an authentication response consisting of the authentication inquiry of the pre-shared key of the coordinator, the authentication inquiry of the pre-shared key of the terminal device and a message authentication code, wherein the message authentication code is calculated from the authentication inquiry of the pre-shared key of the coordinator and the authentication inquiry of the pre-shared key of the terminal device;

c. calculating, by the coordinator upon reception of the authentication response, the unicast key from the base key and the authentication inquiry of the pre-shared key of the coordinator generated in the step a and the authentication inquiry of the pre-shared key of the terminal device, then verifying the authentication inquiry of the pre-shared key of the coordinator for consistency and the message authentication code of the terminal device for validity, wherein if verification fails, the authentication fails; otherwise, the coordinator transmits an authentication acknowledgement consisting of the authentication inquiry of the pre-shared key of the terminal device and the message authentication code calculated by the coordinator on the authentication inquiry of the pre-shared key of the terminal device to the terminal device; and d. verifying, by the terminal device upon reception of the authentication acknowledgement, the authentication inquiry of the pre-shared key of the terminal device for consistency and the message authentication code of the coordinator for validity, wherein if verification fails, the authentication fails; otherwise, the authentication is successful.

5. The method according to claim 4, further comprising:
performing, by the terminal device upon successful connection to the coordinator, unicast key negotiation with the coordinator.

6. The method according to claim 5, wherein:
when the unicast key is required to be created or updated, the coordinator determines whether the unicast key negotiation is a unicast key negotiation for a first time upon successful authentication with the terminal device, and if so, a process of the unicast key negotiation is the same as the authentication process; otherwise, the process of the unicast key negotiation is the same as the unicast key negotiation process based upon the ID-based authentication and key management suite.

7. The method according to claim 2, further comprising:
performing, by the coordinator and the terminal device, a multicast key announcement process upon completion of the unicast key negotiation; and
if the unicast key negotiation is passed and the coordinator is required to perform multicast key negotiation with the terminal device, performing, by the coordinator, the multicast key announcement process with the terminal device.

8. The method according to claim 7, wherein the multicast key announcement process comprises:
when a multicast key is required to be created or updated, firstly calculating, by the coordinator upon successful unicast key negotiation, the multicast key from an announcement master key, then encrypting the announcement master key using an encryption key in the unicast key to generate an identifier of a multicast key announcement, and finally transmitting to the terminal device the multicast key announcement consisting of the identifier of the multicast key announcement, the encrypted multicast announcement master key and a message authentication code, wherein the message authentication code is calculated by the coordinator from the identifier of the multicast key announcement and the encrypted multicast announcement master key using an authentication key in the multicast key;

verifying, by the terminal device upon reception of the multicast key announcement, the identifier of the multicast key announcement and calculating the multicast key from the announcement master key, then further verifying the message authentication code of the coordinator for validity, and when verification is passed, transmitting to the coordinator a multicast key response consisting of the identifier of the multicast key announcement and a message authentication code, wherein the message authentication code is calculated by the terminal device from the identifier of the multicast key announcement message using an authentication key in a locally generated multicast key; and verifying, by the coordinator upon reception of the multicast key response, the identifier of the multicast key announcement for consistency and the message authentication code of the terminal device for validity, wherein if verification fails, the multicast key negotiation fails; otherwise, the multicast key negotiation is successful.

9. An authentication access system applicable to a wireless multi-hop network, comprising a terminal device, a coordinator and a trusted center, wherein:

the terminal device and the coordinator are provided with an uncontrolled port and a controlled port, wherein the uncontrolled port pass an authentication protocol data packet and management information and the controlled port pass an application data packet;

the coordinator is adapted to broadcast a beacon frame comprising authentication and key management suites supported by the coordinator, to perform an authentication process with the terminal device and the trusted center according to an authentication and key management suite selected by the terminal device upon reception of a connection request command of the terminal device, wherein the connection request command comprises the authentication and key management suite selected by the terminal device, and to open the controlled port to allow an access of the terminal device to the wireless multi-hop network while to transmit a connection response command to the terminal device upon successful authentication; and the terminal device is adapted to select the authentication and key management suite and then transmit the connection request command to the coordinator upon reception of the beacon frame of the coordinator, wherein the connection request command comprises the authentication and key management suite selected by the terminal device and to open the controlled port to thereby access the wireless multi-hop network upon reception of the connection response command of the coordinator; and the trusted center is adapted to facilitate the authentication process of the coordinator and the terminal device;

wherein the authentication and key management suites comprise an authentication and key management suite based upon a pre-shared key and an ID-based authentication and key management suit, and wherein the authentication process comprises:

A. when the coordinator knows from the connection request command transmitted from the terminal device that the authentication and key management suite selected by the terminal device is an ID-based authentication and key management suite, generating an authentication inquiry of the coordinator, and transmitting an authentication activation consisting of the authentication inquiry of the coordinator and a public key of the coordinator to the terminal device;

B. when validity verification of the public key of the coordinator is passed, generating, by the terminal device upon reception of the authentication activation, an authentication inquiry of the terminal device, an identifier of a public key revocation query and a temporary public key of the terminal device, and transmitting an authentication request consisting of the authentication inquiry of the terminal device, the authentication inquiry of the coordinator, a public key of the terminal device, the identifier of the public key revocation query, the temporary public key of the terminal device and a signature of the terminal device on the above five items of information to the coordinator;

C. verifying, by the coordinator upon reception of the authentication request, the signature of the authentication request for legality, the authentication inquiry of the coordinator for consistency and the temporary public key of the terminal device for validity; when verification is passed, determining according to the identifier of the public key revocation query whether to perform the public key revocation query; if the public key revocation query is not to be performed, generating a temporary public key of the coordinator and an access result, then transmitting, by the coordinator, an authentication response consisting of the identifier of the public key revocation query, the authentication inquiry of the terminal device, the temporary public key of the coordinator, the access result and a signature of the coordinator on the above four items of information to the terminal device, and then performing step G; or if the public key revocation query is to be performed, transmitting a public key revocation query request;

D. verifying, by a trusted center upon reception of the public key revocation query request, the information of the public key revocation query request, and then transmitting a public key revocation query response to the coordinator;

E. verifying, by the coordinator upon reception of the public key revocation query response, the information of the public key revocation query response, and then transmitting the authentication response to the terminal device; and also generating a base key between the terminal device and the coordinator according to the temporary public key of the terminal device and a temporary private key of the coordinator;

F. verifying, by the terminal device upon reception of the authentication response, the information of the authentication response, wherein if verification fails, the authentication fails; otherwise, the terminal device generates the base key between the terminal device and the coordinator according to the temporary public key of the terminal device and the temporary private key of the coordinator and the authentication is successful; and G. verifying, by the terminal device upon reception of the authentication response transmitted in the step C from the coordinator, the signature of the authentication response for validity, the authentication inquiry of the terminal device for consistency and the access result, wherein if verification fails, the authentication fails; otherwise, the terminal device generates the base key between the terminal device and the coordinator according to the temporary public key of the terminal device and the temporary private key of the coordinator and the authentication is successful; or a. when the coordinator knows from the connection request command transmitted from the terminal device that the authentication and key management suite selected by the terminal device is an authentication and key management suite based upon a pre-shared key, expanding, by the coordinator, a locally stored pre-shared key between the coordinator and the terminal device into a corresponding base key, generating an authentication inquiry of a pre-shared key of the coordinator, and then transmitting an authentication request consisting of the authentication inquiry of the pre-shared key of the coordinator to the terminal device;

b. firstly expanding, by the terminal device upon reception of the authentication request, the locally stored pre-shared key between the coordinator and the terminal device into the corresponding base key, generating an authentication inquiry of a pre-shared key of the terminal device, generating a unicast key between the terminal device and the coordinator according to the base key, the authentication inquiry of the pre-shared key of the coordinator and the authentication inquiry of the pre-shared key of the terminal device, and then transmitting to the coordinator an authentication response consisting of the authentication inquiry of the pre-shared key of the coordinator, the authentication inquiry of the pre-shared key of the terminal device and a message authentication code, wherein the message authentication code is calculated from the authentication inquiry of the pre-shared key of the coordinator and the authentication inquiry of the pre-shared key of the terminal device;

c. calculating, by the coordinator upon reception of the authentication response, the unicast key from the base key and the authentication inquiry of the pre-shared key of the coordinator generated in the step a and the authentication inquiry of the pre-shared key of the terminal device, then verifying the authentication inquiry of the pre-shared key of the coordinator for consistency and the message authentication code of the terminal device for validity, wherein if verification fails, the authentication fails; otherwise, the coordinator transmits an authentication acknowledgement consisting of the authentication inquiry of the pre-shared key of the terminal device and the message authentication code calculated by the coordinator on the authentication inquiry of the pre-shared key of the terminal device to the terminal device; and d. verifying, by the terminal device upon reception of the authentication acknowledgement, the authentication inquiry of the pre-shared key of the terminal device for consistency and the message authentication code of the coordinator for validity, wherein if verification fails, the authentication fails; otherwise, the authentication is successful.

* * * * *